June 12, 1951     P. E. GAIRE     2,556,806
MAGNIFYING RUNNER FOR SLIDE RULES
Filed Nov. 30, 1948
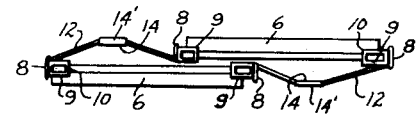
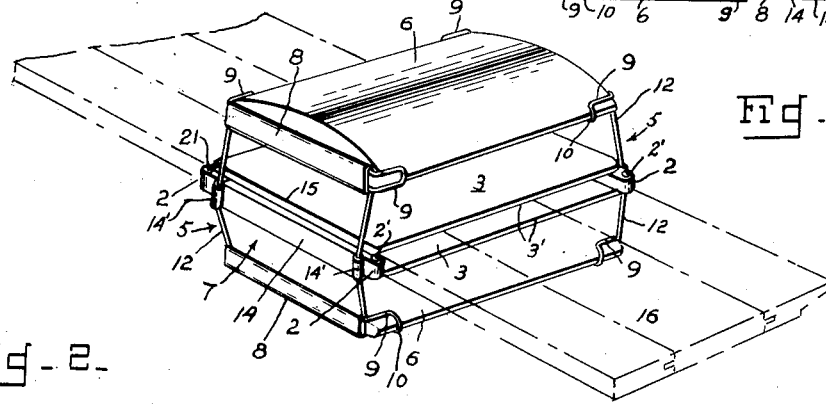
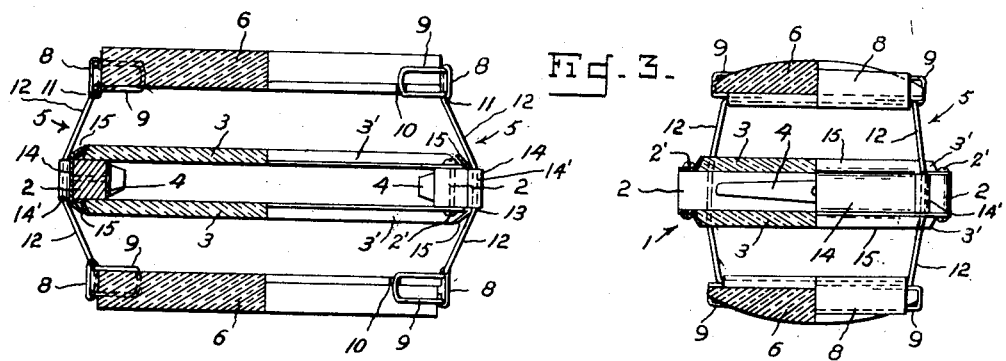
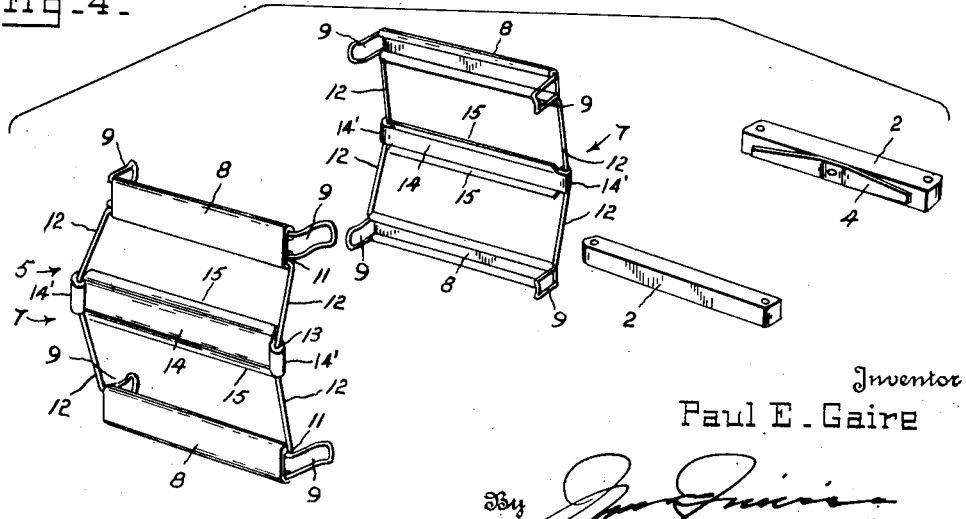
Inventor
Paul E. Gaire
ATTORNEY Patented June 12, 1951

2,556,806

UNITED STATES PATENT OFFICE 2,556,806

MAGNIFYING RUNNER FOR SLIDE RULES

Paul E. Gaire, Manasquan, N. J.

Application November 30, 1948, Serial No. 62,711

15 Claims. (Cl. 235—70)

This invention relates to improvements in means for magnifying the scales of data on duplex or double-faced slide rules and more particularly to a magnifying runner or cursor for such slide rules.

In my application for patent, filed June 4, 1946, Serial No. 674,311, now abandoned, I disclosed a somewhat similar device, but applicable for viewing the scales on but one surface of a rule. However, where it is desired to utilize the device on duplex slide rules where the scales are on opposite surfaces, I have developed a construction to fit on the rule so that the scales on either surface may be magnified and read without the necessity of removing the device and reinserting the rule, as in the case of the structure described in the prior application.

The primary object of this invention is to provide a device capable of being fitted to a duplex slide rule, whereby the scales on opposite surfaces of the rule will be magnified so that the data can be conveniently read.

A further object of the invention is to provide a device having dual magnifying glasses or lenses with means to resiliently support the lenses on a rule and yet capable of being slid back and forth, whereby both surfaces of the rule can be viewed, without removing the devices and again fitting same when it is desired to view the various scales.

A further object of the invention is to provide a flexible frame for supporting the magnifying lenses, together with means for supporting the rule in the frame.

These and other objects and advantages of the invention will be hereinafter described and particularly pointed out in the claims.

In the accompanying drawings:

Fig. 1 is a perspective view of my improved device.

Fig. 2 is a side elevation partially in section.

Fig. 3 is an end view partially in section.

Fig. 4 is a detail perspective view showing the parts separated.

Figure 5 is a perspective view of the runner or cursor in folded position removed from the slide and rule.

1 designates generally an indicator slide comprising two parallel side bars 2—2 connected on opposite faces at their ends by a pair of inner spaced parallel hairline transparent plates 3—3 mounted on frames 3'—3' forming bezels, through holes at their corners and sockets at the ends of the bars by suitable means such as screws 2'. On the inner face of one or both of the side bars and between the transparent plates 3—3 is a flat spring 4.

The slide is mounted in an independently flexible, foldable or collapsible frame 5 supporting oppositely disposed spaced apart parallel magnifying glasses 6—6 outwardly of the transparent plates 3—3 when in position in the frame to slidably receive or engage a double-faced slide rule as indicated at 16 in phantom in Figure 1. The frame consists of two side members 7—7. Each member consists of upper and lower cross bars 8—8 at the ends of the lenses 6—6 and preferably of angularly bent side strips with their opposite longitudinal edges turned in to form tubular portions to enclose elongated wire frames provided at opposite ends with inturned looped wire clips 9—9 to engage in notches 10—10 in the transverse edges adjacent the corners of the magnifying glasses or lenses 6—6. Hinged or pivoted in parallel relation at 11—11 to the cross bars 8—8 at their inner tubular portions are the inturned ends of pairs of connecting corner side bars or legs 12—12 which extend between the lenses 6—6 and are bowed or angularly bent outwardly in obtuse angled form at their middle portion, as at 13—13 and connecting the central portions of the legs 12—12 are central cross bars or strips 14 having their ends turned or curled outwardly to form tubular portions 14' clamped on the outwardly offset intermediate or middle portions 13—13 of the legs 12—12 so that bars 14 are positioned intermediately between and parallel to each pair of cross or side bars 8—8, lenses 6—6 and hair-line plates 3—3. The upper and lower edges of the cross bars 14 are turned inwardly, at obtuse angles as at 15, to engage the opposite side bars 2—2 at the opposite ends or longitudinal edges of transparent hair line plates 3—3 and frames or bezels 3'—3' thereof and provide parallel guides or guideways to slidably and removably receive the slide 1 comprised by transparent plates 3—3, frames or bezels 3'—3' and bars 2—2 therein.

In use, the slide 1 is mounted in the guides formed by the inturned edges 15, the inturned edges engaging over the outer longitudinal edges of bars 2—2 anchored at the ends of the frames 3'—3' surrounding the rigidly connected spaced parallel transparent plates 3—3 so that the latter are supported intermediately between and parallel to the magnifying glasses 6 supported and held in side members 7 of frame 5 in equidistantly spaced parallel relation to and above and below or outwardly of the transparent hair line plates 3—3. Then the slide rule or indicator 16 is passed through the slide and frictionally engaged at the opposite longitudinal edges thereof by the spring or springs 4, to hold the device in adjusted relation with the rule. The outward offsetting of the guides or guideways formed by the bent or grooved bars 14, bars 2 and ends of the transparent hair line plates 3 relative to the bars 8 and ends of the magnifying lenses 6, facilitates viewing the scales on the opposite faces of the double-faced slide rule 16, and as long as the slide 1 is in position in and between the guides 14 and on the slide rule, the runner or cursor and frame 5 thereof will be held in erect or extended operative substantially rectangular open position on the rule and against collapsing or folding on the hinges or pivots 11. However, when removed from the rule, the whole device including the slide 1 and frame 5 with the plates 3 and lenses 6, may be collapsed or compactly folded transversely as a parallelogram in compact form as seen in Figure 5, on the parallel pivot hinges 11 to displace the guides 14 from bars 2 and occupy a minimum of space, or the frame 5 and lenses 6 removed or slid off of the slide 1 or bars 2 thereof at guides 14, while the slide is or remains on the rule, and then collapsed or folded as a separtee unit. Obviously because of the side members of the frame being hinged or pivoted to the cross bars 8, there is a certain amount of flexibility to the device to permit it to slide without undue friction on the rule and prevent binding against the opposite edges of the rule, and yet when in use the device is substantially rigid on the rule.

When a rule is placed in the slide, by reason of the oppositely disposed magnifying glasses appropriately spaced from the surface of the rule, the various scales can be conveniently viewed and read with great convenience.

By providing the slide of transparent plates or glass 3, the scales will be clearly visible through the magnifying lenses.

What I claim is:

1. In a device of the character described comprising a transparent slide including spaced apart transparent plates, a flexible frame in which the transparent slide is mounted, and magnifying lenses hinged at opposite ends to the upper and lower ends of the flexible frame and spaced apart from the transparent slide.

2. In a device of the character described, comprising oppositely disposed flexible frames, spaced apart magnifying lenses pivotally supported by and extending between the frames, and a rule support mounted between the frames to receive a rule.

3. In a device of the class described, a pair of flexible frames foldably supporting spaced apart magnifying lenses, a rule support on the frames intermediate the magnifying lenses, said rule support comprising end bars and upper and lower transparent plates between which a rule fits, and a spring secured to the inner side of one of the bars to engage the side of a rule.

4. A device of the class described comprising a pair of frames, magnifying lenses supported by the frames in spaced relation, said frames having guides intermediate the magnifying lenses, a slide including end bars to fit in the guides, and transparent upper and lower plates connecting the end bars to provide space for a rule.

5. A device of the class described, comprising a pair of frames, each frame including a pair of legs, upper and lower cross bars hinged to the legs, and an intermediate bar connecting the legs, magnifying glasses supported by the frames, and a transparent slide mounted in the intermediate cross bars.

6. An attachment for slide rules comprising oppositely disposed flexible frames, each frame including a pair of end legs, having their ends turned inwardly toward each other, a central cross bar having its upper and lower edges bent inwardly to provide a guide way, the ends of said crossbar being bent to provide sockets to embrace the central part of the pair of end legs, upper and lower cross bars spaced from the central cross bar, the ends of the upper and lower cross bars having their inner edges bent to receive the inturned ends of the legs to provide hinge connections, clips at the ends of the opposed upper and lower cross bars, a rule support comprising side bars supported in the guideways of the oppositely disposed flexible frames and spaced apart transparent plates attached to the side bars, and a pair of lenses between the opposed upper and lower cross bars of the flexible frames, the clips clamping the lenses at their corners to support same.

7. In a magnifying runner for double-faced slide rules, a pair of oppositely disposed spaced parallel magnifying lenses, frames hinged at the ends of the lenses and extending therebetween, and guideways carried by the frames spaced between and parallel to the lenses to slidably engage on the opposite ends of a rule slide having spaced transparent hair line plates slidable on the rule.

8. In a magnifying runner for double-faced slide rules, a pair of oppositely disposed spaced parallel magnifying lenses, frames hinged at the ends of the lenses and extending therebetween, opposed guideways carried by the frames midway between the ends of the lenses, and connected spaced parallel transparent plates slidably mounted in the guideways between and in spaced parallel relation to the lenses to receive a double-faced slide rule therebetween.

9. In a magnifying runner for double-faced slide rules, a pair of oppositely disposed spaced parallel magnifying lenses, frames hinged at the ends of the lenses and extending therebetween, and guideways carried by the frames midway between and in spaced parallel relation to the lenses, said guideways opposing each other at the inside to slidably and removably receive the end bars of a rule slide having spaced parallel transparent plates extending between and connecting the bars on opposite faces thereof, said runner adapted to be folded into collapsed position on the hinged connections when removed from the slide.

10. In a magnifying runner for double-faced slide rules, a pair of oppositely disposed spaced parallel magnifying lenses, frames hinged at the ends of the lenses and extending therebetween, opposed guideways carried by the frames midway between the ends of the lenses, and a slide comprising connected spaced parallel transparent plates slidably mounted in the guideways between and in spaced parallel relation to the lenses to receive a double-faced slide rule therebetween, said hinged connections at the ends of the lenses being all parallel and detachable from the lenses, said lenses and frames being transversely collapsible in compact form on the hinged connections to either side upon dismounting the slide from the rule or the runner from the slide.

11. In a magnifying cursor for double-faced slide rules, a pair of oppositely disposed spaced parallel magnifying lenses, frames having legs hinged at the ends of the lenses and extending therebetween, cross bars forming opposed guides carried by the legs midway between and parallel to the ends of the lenses, and spaced parallel transparent plates having connecting bars at the ends thereof slidably mounted in the guides between and in spaced parallel relation to the lenses to slidably engage on a double-faced slide rule.

12. In a magnifying cursor for double-faced slide rules, a pair of opposed spaced parallel magnifying lenses, end frames having corner legs bent outwardly at their middle portions, cross bars engaged on the ends of the lenses and pivoted to the corresponding ends of the legs to permit folding of said lenses and frames toward each other or opening thereof to erect substantially parallelogram form, central cross bars connecting the pairs of legs at the ends of the lenses and forming guideways at the inside opposing each other, end bars slidable into and out of the guideways and spaced parallel transparent plates having their ends secured on opposite faces of the end bars to slidably engage a double-faced slide rule between the bars and plates, said central cross bars and end bars being offset outwardly of the ends of the lenses.

13. In a device of the class described, a pair of flexible frames pivotally connecting and supporting spaced apart magnifying lenses, a rule support on the frames intermediate the magnifying lenses, said rule support comprising end bars and spaced upper and lower transparent plates between which a rule fits, and a spring secured to the inner side of one of the bars to engage the side of a rule.

14. A device of the class described comprising a pair of frames, magnifying lenses pivotally connecting and supported by the frames in spaced relation, said frames having guides intermediate the magnifying lenses, a slide including end bars to fit in the guides, and transparent upper and lower plates connecting the end bars to provide space for a rule.

15. A device of the class described, comprising a pair of frames, each frame including a pair of legs, upper and lower cross bars hinged between the legs, and an intermediate grooved bar connecting the legs, magnifying glasses supported by the frames between the opposed upper and lower cross bars, and a transparent slide removably mounted in the intermediate cross bars.

PAUL E. GAIRE.

REFERENCES CITED

The following references are of record in the file of this patent:

UNITED STATES PATENTS

| Number | Name | Date |
|---|---|---|
| 540,184 | Norris | May 28, 1895 |
| 806,836 | Printz | Dec. 12, 1905 |
| 996,039 | Keuffel | June 20, 1911 |
| 1,424,807 | Dieckmann | Aug. 8, 1922 |
| 1,605,922 | Cook | Nov. 9, 1926 |
| 1,667,449 | Wompner | Apr. 24, 1928 |
| 1,855,523 | Langsner | Apr. 26, 1932 |
| 2,086,502 | Keuffel | July 6, 1937 |
| 2,405,720 | Snedaker | Aug. 13, 1946 |
| 2,478,547 | Pignone | Aug. 9, 1949 |